United States Patent
Zaluska et al.

(10) Patent No.: US 6,514,478 B2
(45) Date of Patent: Feb. 4, 2003

(54) LI-BASED HYDROGEN STORAGE COMPOSITION

(75) Inventors: Alicja Zaluska, Montreal (CA); Leszek Zaluski, Montreal (CA); John Olaf Strom-Olsen, Montreal (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/820,836

(22) Filed: Mar. 30, 2001

(65) Prior Publication Data
US 2001/0014309 A1 Aug. 16, 2001

Related U.S. Application Data

(63) Continuation of application No. PCT/CA98/00946, filed on Oct. 7, 1998.

(51) Int. Cl.[7] ............ C01B 3/04; C01B 6/04; C01B 6/24; C09K 3/00
(52) U.S. Cl. ............ 423/644; 252/183.14; 423/646; 423/648.1; 423/658.2
(58) Field of Search ............ 423/648.1, 646, 423/658.2, 645, 644, 647; 252/183.14

(56) References Cited

U.S. PATENT DOCUMENTS

| | | | |
|---|---|---|---|
| 3,811,972 A | * | 5/1974 | Niebylski et al. ........ 423/658.2 |
| 4,478,813 A | | 10/1984 | Marlett |
| 4,828,606 A | | 5/1989 | Bogdanovic et al. |
| 5,763,363 A | | 6/1998 | Schulz et al. |
| 6,080,381 A | * | 6/2000 | Zaluska ............ 423/658.2 |
| 6,106,801 A | * | 8/2000 | Bogdanovic et al. .... 423/658.2 |

OTHER PUBLICATIONS

Sakamoto Y. et al, "Hydrogen Solubility in PDILIO.94 and PD2L11.04 Compounds" Journal of Alloys and Compounds, vol. 231, No. 1, Dec. 15, 1995, pp. 533–536.

Preparation and Properties of Amorphous Hydrides, Robert C. Bowman, Jr. Materials Science Forum, vol. 31 (1988) pp. 197–228, Trans Tech Publications, Switzerland. (no month).

* cited by examiner

Primary Examiner—Wayne A. Langel
(74) Attorney, Agent, or Firm—Ogilvy Renault

(57) ABSTRACT

A hydrogen storage composition has a hydrogenated state and a dehydrogenated state; the hydrogenated state comprises a hydrided composition of lithium and an element M which forms a hydride, for example Be or Mg, an element E which forms a compound or solid solution with lithium, e.g. C, B or Zn, or a mixture thereof; there are thus provided reversible Li-based hydrides of high hydrogen capacity.

19 Claims, 3 Drawing Sheets

LI-BASED HYDROGEN STORAGE COMPOSITION

CROSS-REFERENCE TO RELATED APPLICATION

This Application is a Continuation of PCT/CA 98/00946, filed Oct. 7, 1998, in which the United States of America was designated and elected, and which remains pending in the International phase until Apr. 7, 2001.

TECHNICAL FIELD

This invention relates to an Li-based hydrogen storage composition and a method of providing a source of hydrogen.

BACKGROUND ART

Despite the great interest in metal hydrides for hydrogen storage, Li-based hydrides have so far attracted only limited attention because of their unfavourable hydrogenation thermodynamics Theoretically, lithium is one of the most attractive elements for hydrogen storage. Lithium is the lightest metal, with atomic mass of 6.941, which is almost two times lighter than carbon, and it forms a simple hydride, LiH. Although lithium hydride has an outstanding hydrogen capacity of 12.5 wt. %, until now it has offered no prospects for reversible hydrogen storage. The hydrogen bond in LiH is very strong, $\Delta H=-90.5$ kJ/mole, and lithium hydride decomposes at temperatures higher than its melting point. The melting temperature of LiH is 680° C., and it decomposes only at temperatures above 720° C. This feature alone excludes LiH from any practical applications because not only does the hydride melt before decomposition, but also the decomposition temperature is far too high for any reversible hydrogen storage application.

There are only a few known Li-based hydrides, of which $LiAlH_4$ is the most significant. This complex hydride is a common reduction agent and is used in many reactions, for example in the production of borates or silanes, according to the following reactions:

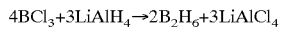

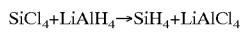

$LiAlH_4$ is not usable for reversible hydrogen storage because it cannot be re-hydrogenated under gaseous hydrogen. After decomposition, $LiAlH_4$ can be re-synthesized only in the course of a chemical reaction, for example:

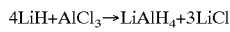

Therefore, $LiAlH_4$ is not practical for reversible hydrogen storage. The same applies to other known Li-based hydrides, which also are not usable for reversible, gaseous hydrogenation and to date, there are no reports of any Li-based metal hydrides capable of hydrogenation/dehydrogenation cycling under practical hydrogen pressures.

DISCLOSURE OF THE INVENTION

This invention deals with a new generation of Li-based metal hydrides with totally new hydrogenation properties. These hydrides undergo hydrogenation/dehydrogenation cycling under practical conditions of hydrogen pressure and temperature and are thus suitable materials for hydrogen storage.

According to the invention, Li is the basic metallic element which forms complex hydride compositions with other elements. The presence of these other elements causes changes in hydrogen sorption properties of the Li-based hydride, so that the hydride becomes usable for reversible hydrogen storage.

In accordance with one aspect of the invention, there is provided a hydrogen storage composition having a hydrogenated state from which hydrogen is liberated and a dehydrogenated state which absorbs gaseous hydrogen to produce said hydrogenated state, wherein said hydrogenated state comprises:

a hydrided composition of lithium and an element selected from the group consisting of:
  a) at least one metal M which forms a hydride, said hydrided composition liberating hydrogen to form a dehydrogenated state comprising LiH and said at least one metal M;
  b) at least one element E, said hydrided composition liberating hydrogen to form a dehydrogenated state comprising a compound of lithium and said at least one element E, or a solid solution of lithium and said at least one element E; and
  c) at least one metal M and at least one element E, as defined above.

In another aspect of the invention, there is provided a composition as defined hereinbefore, in the hydrogenated state.

In yet another aspect of the invention there is provided a composition as defined hereinbefore, in the dehydrogenated state.

In still another aspect of the invention there is provided a method of producing a source of hydrogen gas comprising liberating hydrogen from a composition of the invention, at an elevated temperature, with formation of the dehydrogenated state of said composition, removing the liberated hydrogen, and regenerating said hydrogenated state by exposing said dehydrogenated state to hydrogen gas.

In another aspect of the invention there is provided a method of producing a hydrogen storage composition of the invention comprising ball milling at least one lithium component selected from elemental lithium and lithium hydride with a component selected from i) at least one metal M, as defined hereinbefore, a hydride thereof, or a mixture thereof; ii) at least one element E, as defined hereinbefore; and iii) at least one of a metal M, as defined hereinbefore, and a hydride thereof; and at least one element E, as defined hereinbefore, to form a lithium-based composition, and, when necessary or desired, hydrogenating the lithium-based composition.

DESCRIPTION OF PREFERRED EMBODIMENTS

Figures 1, 2:
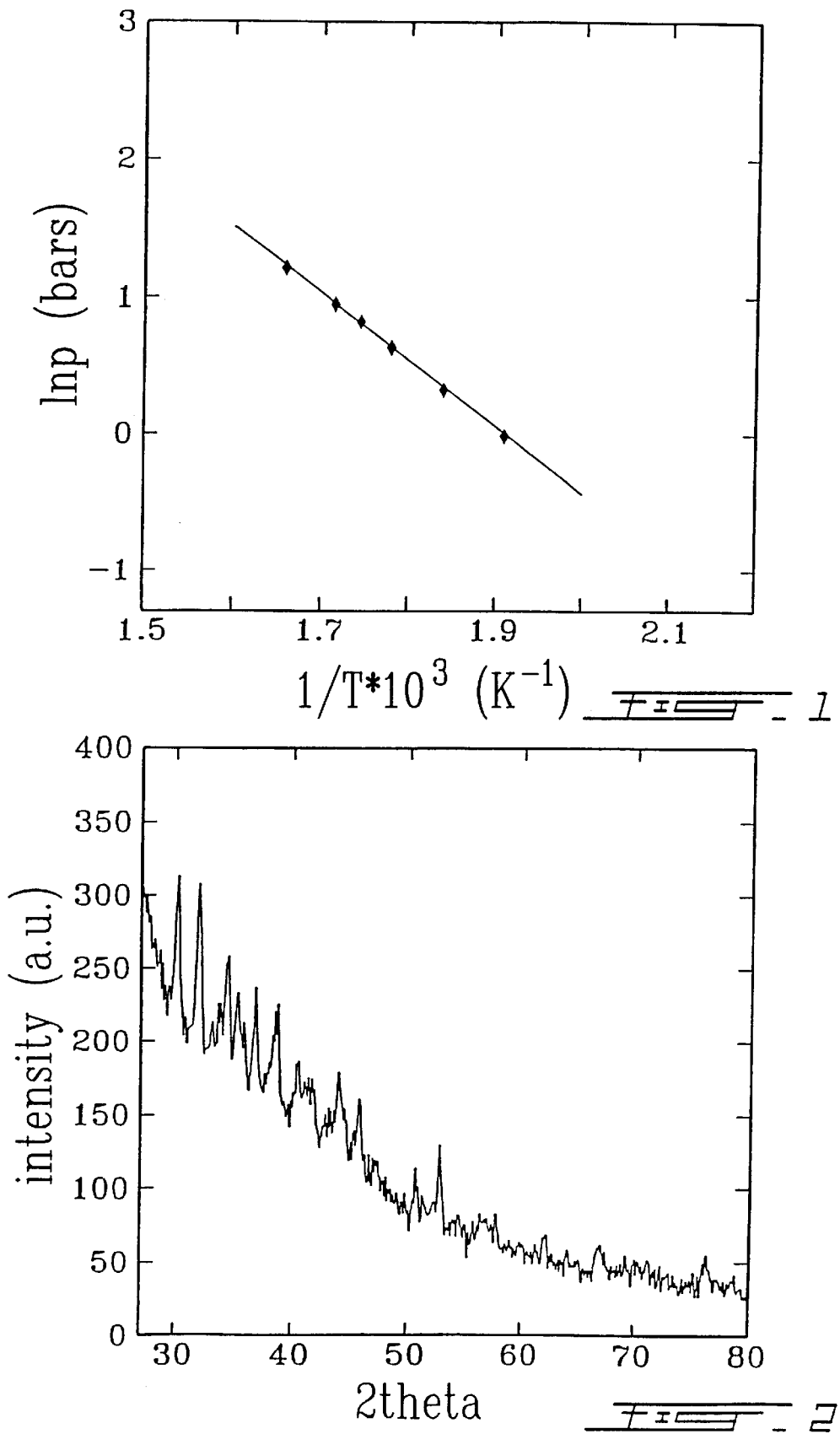
FIG. 1 illustrates graphically thermodynamic properties of Li—Be—H hydrides of the invention in the form of a Van't Hoff plot.
FIG. 2 is an X-ray diffraction pattern of $Li_5Be_3H_{11}$ a hydride of the invention after formation by hydrogenation.

In this specification, reference to a dehydrogenated state refers to a state produced by liberating hydrogen from the hydrogen storage composition of the invention in the hydrogenated state; it is not intended to indicate complete removal of hydrogen from the composition, and indeed the invention contemplates both complete removal of hydrogen and partial removal of hydrogen from the hydrogenated state of the composition.

Within the new generation of reversible Li-based metal hydrides of the invention, there are three main families of hydrogen storage compositions:
1. Complex hydrides consisting of Li and at least one metal M, in which the decomposition products consist of LiH and the metal M;
2. Li-based hydrides in which the at least one element E forms a compound or solid solution with lithium, after decomposition of the hydride.
3. Li-based hydrides which contain at least one metal M and at least one element E so that the above characteristics in 1 and 2 are present.

Group 1

Hydrided compositions in this group contain two or more metallic components, of which one is lithium. The second metal or metals, M, is chosen from elements that are able to form compounds with hydrogen, such as Be, Mg, Ti, V, Zr, which form the following respective hydrides: $BeH_2$, $MgH_2$, $TiH_2$, $VH_2$ and $ZrH_2$. None of these metals M forms an intermetallic compound or solid-state solution with lithium, as reflected by their respective phase equilibrium diagrams.

In the hydrogenated state, the hydrided composition according to the invention is a complex hydride of lithium and the at least one metal M. The hydride formula can be written as follows:

$$Li_xM_yH_z \qquad (I)$$

wherein x is an integer of 1–5, y is an integer of 1–3, and z is an integer such that z=x+2y.

M may comprise one or more different metals M.

The mechanism of reversible hydrogenation/dehydrogenation for this group of Li-based hydrided compositions obeys the following reaction:

$$Li_xM_yH_z = xLiH + yM + yH_2$$

As a result of this reaction, gaseous hydrogen is released, with lithium hydride, LiH, and pure metal M being the reaction products.

The above complex Li-based hydrides differ from the respective hydrides of their components, LiH and $MH_2$, in both crystallographic structure and thermodynamic properties. Specifically, the changed equilibrium pressure of hydride formation allows the system to be used for reversible hydrogenation cycling.

In an especially preferred embodiment, the metal M is beryllium. Normally beryllium hydride, $BeH_2$, is extremely difficult to fabricate. So far it has been possible to produce it only by complicated organometallic methods. Until now there was no reported synthesis of $BeH_2$ from elements, i.e. from beryllium and hydrogen, and also in no case was beryllium hydride found to be capable of reversible hydrogenation performance.

In this invention, complex Li—Be-hydrides can be easily fabricated and exhibit outstanding reversible hydrogenation performance. In this case the above reaction of the reversible hydrogenation can be described as follows:

$$Li_xBe_yH_z = xLiH + yBe + yH_2$$

wherein x, y and z are as described above.

Although this reaction can effectively occur for various values of x, y and z, for example $Li_3BeH_5$ or $Li_2BeH_4$, an optimum performance and maximum reversible hydrogen capacity was found for x=5, y=3 and z=11, i.e. $Li_5Be_3H_{11}$. Although this complex Li-based hydrided composition behaves upon hydrogenation as a single phase, with a single plateau pressure for hydrogenation, x-ray diffraction indicates that structurally it does not constitute a homogeneous, single Li—Be—H phase. Based on preliminary results it is most probable that $Li_5Be_3H_{11}$ consists of interwaved layers of 2 $Li_2BeH_4$ and $LiBeH_3$. This interwaved layer structure is perhaps responsible for the outstanding hydrogenation properties of this material.

Reversible hydrogenation of $Li_5Be_3H_{11}$ proceeds according to the following reaction:

$$Li_5Be_3H_{11} = 5LiH + 3Be + 3H_2$$

As a result of this reaction, a very large amount of hydrogen can be released and subsequently re-absorbed under practicable pressure and temperature conditions. Complex $Li_5Be_3H_{11}$ hydride can reversibly absorb as much as 8.2 wt. % of hydrogen. This hydrogen capacity is thus far the highest reversible capacity ever recorded in a metal hydride.

Thermodynamic properties of complex Li—Be—H hydrides were determined by measuring a series of pressure-composition isotherms for different temperatures. The results for $Li_5Be_3H_{11}$ are shown in FIG. 1 in the form of a Van't Hoff plot, representing a relation between equilibrium pressure and temperature for $Li_5Be_3H_{11}$. As can be seen from FIG. 1, this hydride can effectively operate over a wide range of temperatures. Desorption of hydrogen can occur for example at 140° C. at a hydrogen pressure lower than 0.1 atm, or at 300° C. if the hydrogen pressure is lower than 1.5 atm. Heat of formation of this hydride is estimated to be about Δ=−40 kJ/mole, which allows the hydride to be easily re-hydrogenated.

Complex Li—M—H hydrides are suitably produced by ball milling followed by gaseous hydrogenation, as described below.

In this process appropriate amounts of the respective components are intermixed and then ball milled. The components can be used either in the form of metals, e.g. Li and M or in the form of the respective hydrides, e.g. LiH and $MH_2$. Mixtures of the metals and hydrides can also be used. In the first case ball milling is applied for proper intermixing of the components with as fine microstructure as possible. Such ball milled material is very active and can be easily hydrogenated to form complex hydrides. In the case of simple hydrides as a starting material, at least part of the hydrogenation reaction may be carried out during ball milling and finished during the first dehydrogenation/dehydrogenation cycle.

Suitably the ball milling achieves a fine particle size compound of particles having a size below 10 microns, preferably below 100 nanometers and more preferably below 10 nanometers.

The process may employ elemental lithium or lithium hydride, and may employ elemental metal M, the hydride thereof, or a mixture thereof. If at least one of the components is employed as the hydride in the ball milling the resulting lithium-based composition functions as a hydrogen storage composition but additional hydrogen may be absorbed by hydrogenation to increase the supply of hydrogen available in the composition. If only elemental components are employed hydrogenation is necessary, during or after the ball milling, or hydrogenation may be carried out both during and after the ball milling.

The progress of formation of the complex hydride or hydride precursor can in many cases be observed by determining physical characteristics periodically during the ball milling, for example, X-ray diffraction patterns, which show characteristics of the new complex, rather than the known characteristics of the individual starting components.

In general, hydrogen liberation is achieved by heating the hydrided composition at a temperature of 100° C. to 300° C., depending on the hydrogen pressure, and the hydrided composition is regenerated from the dehydrogenated state by heating at a temperature of 100° C. to 350° C. under a gaseous hydrogen atmosphere at a pressure of 5 to 60 atm.

Group 2

Li-based hydrided compositions from this family differ from the complex hydrides of Group 1 mainly in the mechanism of the hydrogenation reaction. In this case, lithium hydride is present in the hydrogenated state, in the form of either a complex hydride or simply LiH, but it decomposes upon dehydrogenation. Properties of lithium hydride, especially the decomposition temperature, are changed by the presence of other elements E, which may react with lithium in the desorbed state, or form solid solutions with lithium. As a result, hydrogen can be released from lithium hydride at temperatures between 100 and 350° C., preferably 150° C. to 300° C., instead of about 720° C.

In this group of hydrided compositions, lithium or lithium hydride is the main component and the stability of LiH is reduced as a result of the presence of one or more of the following elements E:

metalloids: C, B, Si or P metals: Zn, Mn, Ni, Fe, Cr, Cu, Al, Ca, Na or K.

The amount of the element E depends on the particular system and specifically on phases that can be formed with lithium, stable or metastable. In general, a molar ratio of Li to the at least one element E is between 7:1 and 1:2.

The metalloids are very effective in changing the properties of LiH, as particularly demonstrated by carbon and boron.

Although Li—C equilibrium phase diagram shows only one stable phase, $Li_2C_2$, the present invention demonstrates that destabilization of LiH occurs within a wide range of compositions. In consequence, Li—C—H hydrides are able to desorb a certain amount of hydrogen at much lower temperatures than LiH, i.e. between 150 and 230° C., and can be at least partially re-hydrogenated for example at 200° C.

Boron also changes stability of LiH in such a way that hydrogen desorption can occur at temperatures between 300 and 350° C. Re-hydrogenation of these hydrides can be performed at similar temperatures.

Amongst the metals E, Zn appears to be the most effective in reducing the desorption temperature of LiH. After hydrogen desorption, lithium forms intermetallic phases with zinc, which phases change the thermodynamic properties of the hydride formation. As a result, Li—Zn—H hydrides can desorb hydrogen at temperatures ranging from 200 to 250° C.

As in the case of alloys from Group 1, Li-based hydrides were fabricated by mechanical alloying. Li or LiH was the main component of the alloy, which was ball milled with the at least one element E. As a result of this process followed by a dehydriding/dehydriding cycle, an alloy with new properties was obtained.

Suitably the ball milling achieves a fine particle size compound of particles having a size below 10 microns, preferably below 100 nanometers and more preferably below 10 nanometers.

As in the case of the Group 1 materials, the ball milling may be carried out with lithium, lithium hydride, or a mixture thereof, and the resulting lithium-based composition hydrogenated to produce the desired level of hydride. The progress of the ball milling may be monitored by determining physical parameters of the lithium-based composition, such as X-ray diffraction patterns of a solid solution of lithium and the element E, or a compound of lithium and the element E, characteristic of the dehydrogenated state, or other physical parameters characteristic of the hydrogenated state, depending on wither lithium or lithium hydride is employed in the ball milling.

Group 3

Li—V—H hydrides are the most characteristic examples of this group of Li-based hydrides. Two kinds of behavior can be observed for these hydrides, namely: reversible hydrogenation based on the formation of altered V-based hydrides as a result of the presence of Li or LiH, and destabilization of LiH as a consequence of the interference by vanadium or vanadium hydride. As a result, new and improved hydrogenation characteristics are observed in the Li—V—H hydrides.

Li-based hydrides with elements from both group 1 and 2 also belong to this family of complex hydrides.

As above, these hydrides were fabricated by ball milling followed by gaseous hydrogenation, and the same considerations apply as set forth in Groups 1 and 2.

Suitably the ball milling achieves a fine particle size compound of particles having a size below 10 microns, preferably below 100 nanometers and more preferably below 10 nanometers.

It can be seen that new Li-based hydrides from the above three groups exhibit a variety of new properties, which are not limited to reversible hydrogen storage. They represent new materials with unique and unexpected properties. They find many possible applications, such as chemical agents or materials for electrochemistry, i.e. for rechargeable metal hydride batteries. In particular, different complex, special structures, such as the layered structure of $Li_5Be_3H_{11}$ or similar hydrides were found to have unique properties, for example electrical conductivity, magnetic properties and heat transport, which can be useful in various applications.

Hydrogen absorption into the dehydrogenated state of the hydrogen storage composition of the invention is typically carried out at a temperature of 100 to 350° C. under a hydrogen pressure of 5 to 60 atm. Hydrogen is typically liberated from the composition in the hydrogenated state by heating to a temperature of 100 to 300° C.

EXAMPLES

Example 1

$Li_5Be_3H_{11}$ hydride was fabricated in the following way.

Figure 3:
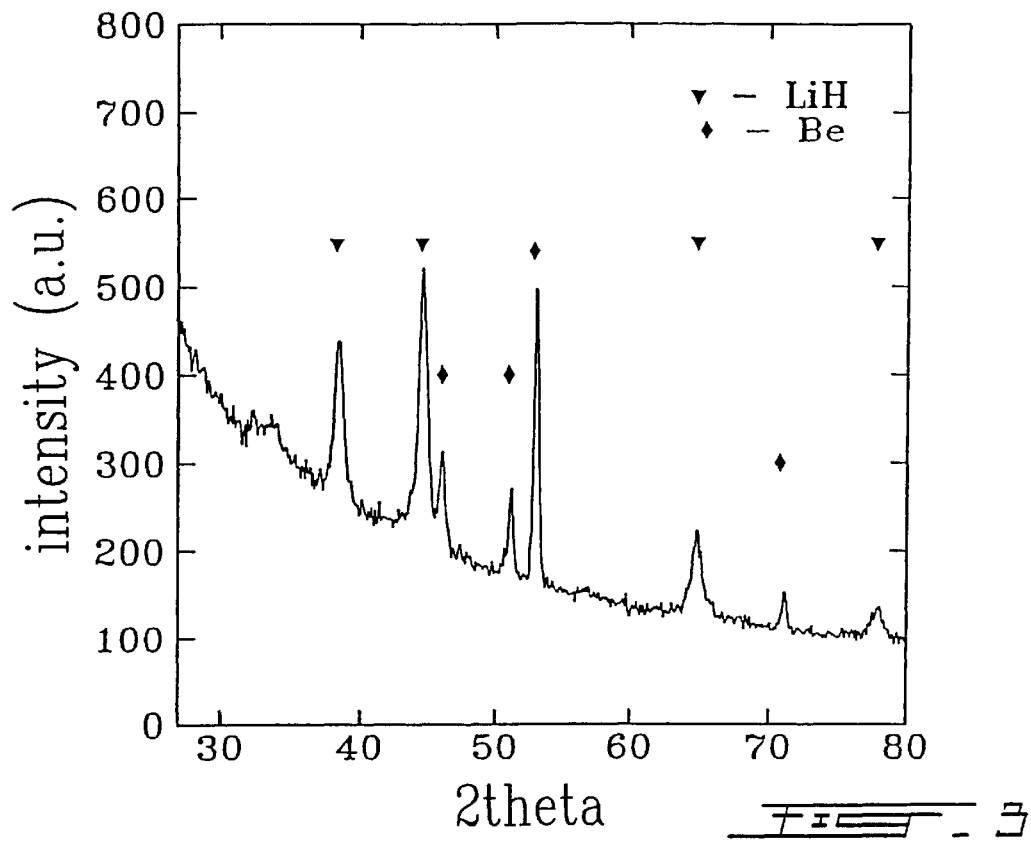
FIG. 3 is an X-ray diffraction pattern of the hydride of FIG. 2 after dehydrogenation to liberate hydrogen.

The respective amounts of lithium hydride and beryllium in accordance with the above formula were sealed under an argon atmosphere in a vial of hardened steel with steel balls. The process of ball milling was performed by using a commercial SPEX 8000 (trade-mark) ball mill or Model SP 2100 ball mill (from SCP Science of St-Laurent, Québec). After ball milling, the material was placed in a gas titration system. The system was evacuated and kept under vacuum for 10 min at room temperature. The system was subsequently heated up to 270° C. and hydrogen was admitted reaching a pressure of 30 atm. Hydrogen absorption started immediately and a hydrogen capacity of almost 8 wt. % was achieved. FIG. 2 shows the x-ray diffraction pattern of the material after hydrogenation, with no traces of free lithium hydride, beryllium or beryllium hydride, which confirms formation of a different, complex structure. The same material after subsequent decomposition, i.e. after releasing of almost 8 wt. % of hydrogen, consists again of lithium hydride, LiH and beryllium (FIG. 3). These two x-ray diffraction patterns can be obtained reversibly for the hydrogenated and dehydrogenated state of the material.

Example 2

Figure 4:
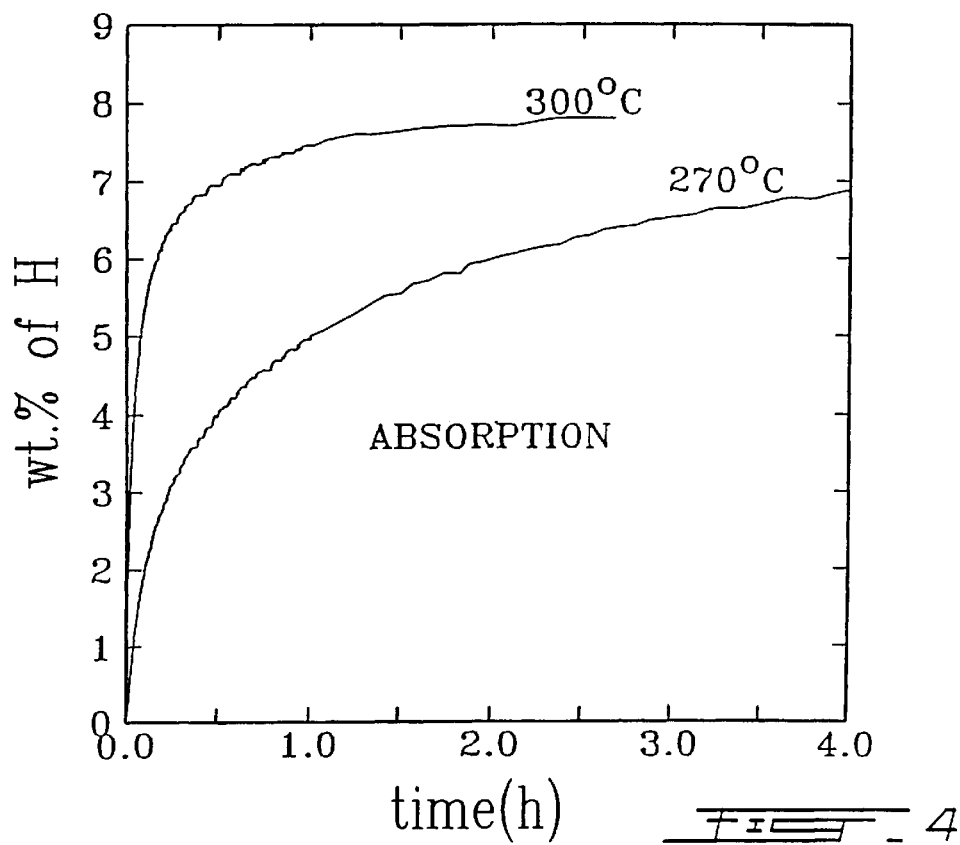
FIG. 4 illustrates graphically the regeneration of $Li_5Be_3H_{11}$ from the dehydrogenated state by absorption of hydrogen at 270° C. and 300° C.
Figure 5:
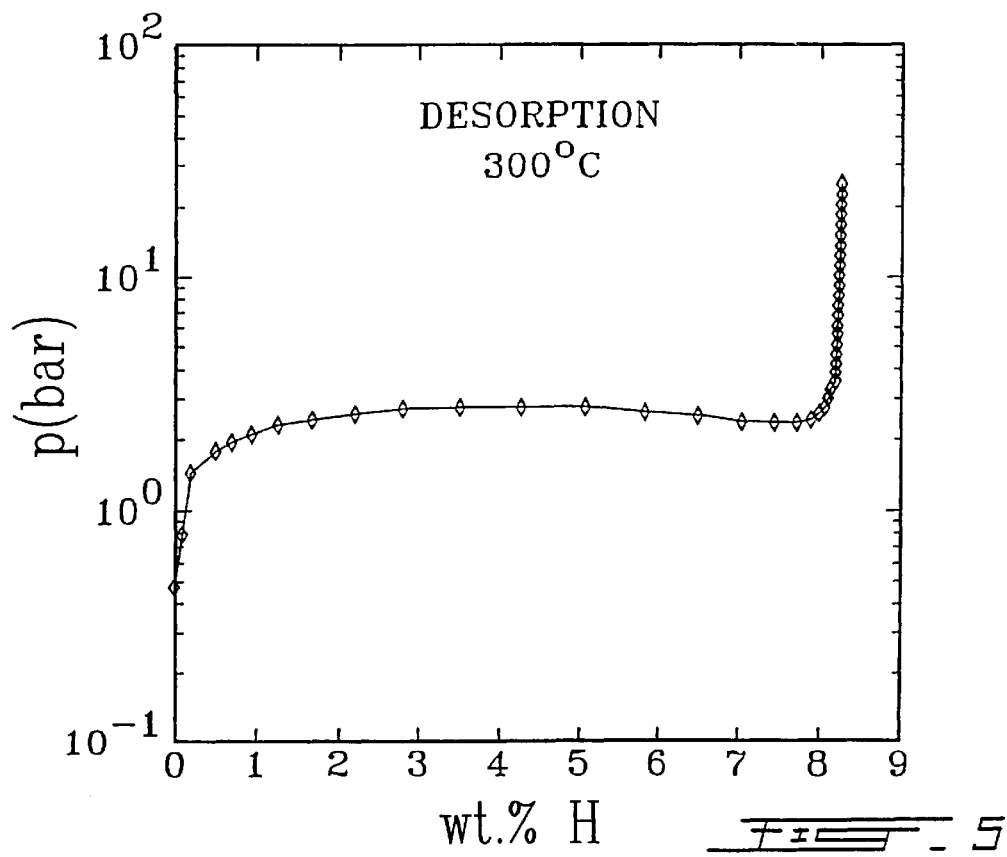
FIG. 5 is a pressure-composition isotherm for hydrogen desorption of $Li_5Be_3H_{11}$ at 300° C.

$Li_5Be_3H_{11}$ was subjected to hydriding/dehydriding cycling in a gas titration system. Although the cycling can be performed at various temperatures according to the Van't Hoff plot shown in FIG. 1, the rate of the reaction is faster at higher temperatures. FIG. 4 shows absorption of hydrogen in the regeneration of $Li_5Be_3H_{11}$ at temperatures of 270° C. and 300° C. The pressure composition isotherm for desorption at 300° C. is presented in FIG. 5.

Example 3

Complex hydrides of Li and other elements were fabricated in a similar way as described in Example 1.

Figure 6:
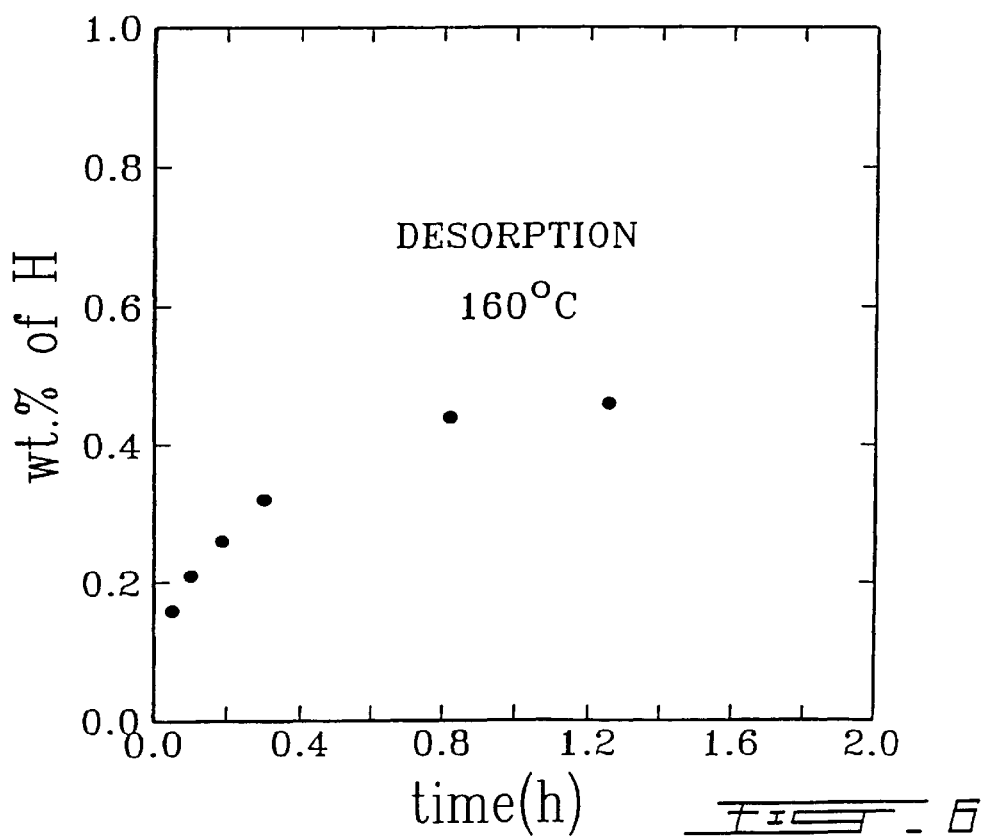
FIG. 6 illustrates graphically, hydrogen desorption for a hydride material derived from LiH and C.

The respective amounts of lithium hydride and carbon, boron, silicon, zinc, iron or vanadium were sealed in steel vials under argon atmosphere inside a glove-box. The molar ratios between LiH and the other elements were, in each case, 1:1. Ball milling was performed in a high-energy ball mill SPEX 8000. The milling was performed by using steel balls, for a period of time of two hours. Hydrogenation properties of these hydrides were measured in the gas titration system. Normally, LiH does not exhibit any hydrogen desorption over the studied temperature range up to 350° C. However, for all of the studied compositions consisting of LiH+other element, a significant desorption of hydrogen occurred at much lower temperatures. FIG. 6 shows hydrogen desorption which was measured at the temperature of 160° C. for a sample consisting of LiH ball-milled with carbon (with molar ratio of 1:1).

We claim:

1. A reversible hydrogen storage composition having a hydrogenated state from which hydrogen is liberated and a dehydrogenated state which absorbs gaseous hydrogen to produce said hydrogenated state, wherein said hydrogenated state comprises:
    a hydrided mechanically alloyed crystalline composition of lithium and a component selected from the group consisting of:
        a) at least one metal M which forms a hydride, said hydrided composition liberating hydrogen to form a dehydrogenated state comprising LiH and said at least one metal M;
        b) at least one element E selected from the group consisting of C, B, Si, P. Zn, Mn, Fe, Cr, Cu, Al, Ca, Na and K, said hydrided composition liberating hydrogen to form a dehydrogenated state comprising a compound of lithium and said at least one element E, or a solid solution of lithium and said at least one element E; and
        c) at least one metal M and at least one element E, as defined above,
    said hydrogenated state liberating hydrogen at a temperature of 100 to 300° C., and said hydrogenated state being regenerated from said dehydrogenated state at a temperature of 100° C. to 350° C. under a gaseous hydrogen atmosphere at a pressure of 5 to 60 atmospheres.

2. A composition according to claim 1 wherein said hydrided composition comprises said lithium and said at least one metal M.

3. A composition according to claim 1 wherein said hydrided composition comprises said lithium and said at least one element E.

4. A composition according to claim 1 wherein said hydrided composition comprises said lithium and said at least one metal M and at least one element E.

5. A composition according to claim 2 wherein said at least one metal M is one which does not form an intermetallic compound or solid-state solution with lithium, as reflected by phase equilibrium diagrams.

6. A composition according to claim 2 wherein said at least one metal M is Be, Mg, Ti, V or Zr.

7. A composition according to claim 2, wherein said hydrided composition is represented by formula (I), $$Li_xM_yH_z \qquad (I)$$

in which
    x is an integer of 1 to 5,
    y is an integer of 1 to 3, and
    z is an integer wherein z=x+2y.

8. A composition according to claim 5, wherein said hydrided composition comprises said lithium and said at least one metal M.

9. A composition according to claim 6, wherein said hydrided composition comprises said lithium and s aid at least one metal M.

10. A composition according to claim 2 wherein said hydrided composition is represented by formula (II):

$$Li_5Be_3H_{11} \qquad (II).$$

11. A composition according to claim 10 wherein said hydrogenated state has an x-ray diffraction pattern as illustrated in FIG. 2 and said dehydrogenated state has an x-ray diffraction pattern as illustrated in FIG. 3.

12. A composition according to claim 3 wherein said at least one element E is C, B, Si or P.

13. A composition according to claim 1 wherein the molar ratio of Li to said at least one element E is 7:1 to 1:2.

14. A composition according to claim 4 wherein said at least one metal M is Be, Mg, Ti, V or Zr and said at least one element E is C, B, Si, P, Zn, Mn, Fe, Cr, Cu, Al, Ca, Na or K.

15. A composition according to claim 1, wherein the mechanically alloyed crystalline composition is in particulate form having been ball milled to a fine particulate size below 100 nanometers.

16. A composition according to claim 1, in said hydrogenated state.

17. A composition according to claim 1, in said dehydrogenated state.

18. A method of producing a source of hydrogen gas comprising:
    liberating hydrogen from a reversible hydrogen storage composition having a hydrogenated state from which hydrogen is liberated and a dehydrogenated state which absorbs gaseous hydrogen to produce said hydrogenated state, wherein said hydrogenated states comprises:
        a hydrided mechanically alloyed crystalline composition of lithium and a component selected from the group consisting of:
            a) at least one metal M which forms a hydride, wherein M is selected from the group consisting of Be, Mg, Ti, V and Zr, said hydrided composition liberating hydrogen to form a dehydrogenated state comprising LiH and said at least one metal M;

b) at least one element E selected from the group consisting of C, B, Si, P, Zn, Mn, Fe, Cr, Cu, Al, Ca, Na and K, said hydrided composition liberating hydrogen to form a dehydrogenated state comprising a compound of lithium and said at least one element E, or a solid solution of lithium and said at least one element E; and c) at least one metal M and at least one element E, as defined above, at a temperature of 100 to 300° C., with formulation of the dehydrogenated state of said composition, removing the liberated hydrogen, and regenerating said hydrogenated state by exposing said dehydrogenated to hydrogen gas at a temperature of 100° C. to 350° C. under a hydrogen pressure of 5 to 60 atm.

19. A method of producing a reversible hydrogen storage composition having a hydrogenated state from which hydrogen is liberated and a dehydrogenated state which absorbs gaseous hydrogen to produce said hydrogenated state, wherein said hydrogenated state comprises:

a hydrided mechanically alloyed crystalline composition of lithium and an element selected from the group consisting of:

a) at least one metal M which forms a hydride, said hydrided composition liberating hydrogen to form a dehydrogenated state comprising LiH and said at least one metal M;

b) at least one element E selected from the group consisting of C, B, Si, P, Zn, Mn, Fe, Cr, Cu, Al, Ca, Na and K, said hydrided composition liberating hydrogen to form a dehydrogenated state comprising a compound of lithium and said at least one element E, or a solid solution of lithium and said at least one element E; and c) at least one metal M and at least one element E, as defined above, said hydrogenated state liberating hydrogen at a temperature of 100 to 300° C., and said hydrogenated state being regenerated from said dehydrogenated state at a temperature of 100° C. to 350° C., under a gaseous hydrogen atmosphere at a pressure of 5 to 60 atmospheres, the method comprising:

ball milling at least one lithium component selected from the group consisting of elemental lithium and lithium hydride with:

(A) a component selected from the group consisting of:

i) at least one metal M, as defined above, a hydride thereof, or a mixture thereof;

ii) at least one element E, as defined above, and iii) at least one of a metal M, as defined above, and a hydride thereof; and (B) at least one element E, as defined above, to form a lithium-based composition, and, optionally hydrogenating the lithium-based composition.

\* \* \* \* \*